UNITED STATES PATENT OFFICE.

HUGH GARMENY TURLEY, OF DORCHESTER, ONTARIO, CANADA.

OINTMENT.

SPECIFICATION forming part of Letters Patent No. 411,077, dated September 17, 1889.

Application filed January 23, 1889. Serial No. 297,300. (No specimens.) Patented in Canada October 3, 1887, No. 27,712.

*To all whom it may concern:*

Be it known that I, HUGH GARMENY TURLEY, a subject of the Queen of Great Britain, residing at Dorchester, in the county of Middlesex and Province of Ontario, Dominion of Canada, have invented a new and useful Ointment, to be used for the treatment of diseases of horses, such as greasy legs, curbs, splints, or any other callous deposits, (for which I have obtained Canadian Patent No. 27,712, dated October 3, 1887,) of which the following is a specification.

My composition consists of the following ingredients, combined in the proportions stated, viz: Iodine, one-half ounce; iodide of potassium, one and one-half ounce; corrosive sublimate, one and one-half ounce; cantharides, one-half ounce; sulphate of copper, one-fourth ounce; Prussian blue, one-fourth ounce; arsenic, one-eighth ounce. I mix these ingredients with hog's lard in sufficient quantity and thoroughly incorporate, and apply to the parts affected, as required, first shaving off the hair and then rubbing well into the part affected.

By the use of the above composition the callous place becomes softened and gradually disappears, one application being usually sufficient. No washing or greasing is required afterward.

What I claim, and desire to secure by Letters Patent of the United States, is—

The herein-described ointment, to be used for the treatment of diseases of horses—such as greasy legs, curbs, splints, or any other callous deposits—consisting of iodine, iodide of potassium, corrosive sublimate, cantharides, sulphate of copper, Prussian blue, arsenic, and hog's lard, in the proportions specified.

HUGH GARMENY TURLEY. [L. S.]

Witnesses:
 HENRY BEECH,
 RICHARD BAYLY.